United States Patent
Ihlar et al.

(10) Patent No.: US 12,381,799 B2
(45) Date of Patent: Aug. 5, 2025

(54) METHODS AND ARRANGEMENTS FOR SUPPORTING ESTIMATION OF LATENCY OVER A COMMUNICATION PATH IN A COMMUNICATION NETWORK

(71) Applicant: Telefonaktiebolaget LM Ericsson (publ), Stockholm (SE)

(72) Inventors: Marcus Ihlar, Älvsjö (SE); Robert Skog, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 359 days.

(21) Appl. No.: 18/021,443

(22) PCT Filed: Aug. 18, 2020

(86) PCT No.: PCT/SE2020/050796
§ 371 (c)(1),
(2) Date: Feb. 15, 2023

(87) PCT Pub. No.: WO2022/039639
PCT Pub. Date: Feb. 24, 2022

(65) Prior Publication Data
US 2023/0308373 A1    Sep. 28, 2023

(51) Int. Cl.
*H04L 43/0864* (2022.01)
*H04L 43/12* (2022.01)
*H04L 47/22* (2022.01)

(52) U.S. Cl.
CPC .......... *H04L 43/0864* (2013.01); *H04L 43/12* (2013.01); *H04L 47/22* (2013.01)

(58) Field of Classification Search
CPC ..... H04L 43/0864; H04L 43/08; H04L 43/12; H04L 47/10; H04L 47/22; H04L 47/283; H04L 43/10
See application file for complete search history.

(56) References Cited

U.S. PATENT DOCUMENTS

2004/0100979 A1* 5/2004 Mandin ............... H04L 9/40
                                                   370/402
2010/0238828 A1* 9/2010 Russell ............ H04L 43/0864
                                                   370/252

FOREIGN PATENT DOCUMENTS

CN          1866905 A    11/2006
CN        101155121 A     4/2008
(Continued)

OTHER PUBLICATIONS

First Office Action for Chinese Patent Application No. 202080103229.1, mailed Mar. 26, 2024, 11 pages.
(Continued)

*Primary Examiner* — Mohamed A Kamara
(74) *Attorney, Agent, or Firm* — Withrow & Terranova, PLLC

(57) ABSTRACT

Method and device(s) for supporting estimation of latency over a communication path in a communication network between a data flow shaping node, providing a data flow in bursts towards a data flow target node, and a probe node. The devices(s) initiate to transmit, by the data flow shaping node, a sample burst being a burst of said bursts that differs in a predefined manner from preceding and subsequent bursts so that the data flow target node in response to the sample burst transmits a certain pattern of acknowledgement packets that differs compared to patterns of acknowledgement packets transmitted by the data flow target node in response to said preceding and subsequent bursts. The device(s) initiates to identify, by the probe node, receipt of potential acknowledgement packets according to said certain pattern.

20 Claims, 8 Drawing Sheets

(56) References Cited

FOREIGN PATENT DOCUMENTS

| | | | |
|---|---|---|---|
| CN | 101291208 | A | 10/2008 |
| CN | 101917342 | A | 12/2010 |
| CN | 102027692 | A | 4/2011 |
| CN | 109155744 | A | 1/2019 |
| JP | 2007028644 | A | 2/2007 |
| KR | 20070011181 | A | 1/2007 |
| WO | 2017167392 | A1 | 10/2017 |
| WO | 2019129163 | A1 | 7/2019 |

OTHER PUBLICATIONS

Examination Report for European Patent Application No. 20764804.9, mailed Nov. 28, 2023, 5 pages.
Iyengar, et al., "QUIC Loss Detection and Congestion Control," Internet Draft 29, Jun. 10, 2020, Internet Engineering Task Force Trust, 39 pages.
Trammell, et al., "The QUIC Latency Spin Bit," Internet Draft, Oct. 23, 2018, Internet Engineering Task Force Trust, 7 pages.
International Search Report and Written Opinion for International Patent Application No. PCT/SE2020/050796, mailed May 6, 2021, 11 pages.
Decision to Grant for Chinese Patent Application No. 202080103229.1, mailed Sep. 29, 2024, 5 pages.
Examination Report for European Patent Application No. 20764804.9, mailed May 21, 2024, 5 pages.

\* cited by examiner

METHODS AND ARRANGEMENTS FOR SUPPORTING ESTIMATION OF LATENCY OVER A COMMUNICATION PATH IN A COMMUNICATION NETWORK

This application is a 35 U.S.C. § 371 national phase filing of International Application No. PCT/SE2020/050796, filed Aug. 18, 2020, the disclosure of which is incorporated herein by reference in its entirety.

TECHNICAL FIELD

Embodiments herein concern a method and arrangements relating to estimation of latency, such as based on Round Trip time (RTT), over a communication path in a communication network, e.g. a wireless communication network, such as a telecommunications network.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Special Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) may be used for the transmission path from the base station to the wireless device. The expression uplink (UL) may be used for the transmission path in the opposite direction i.e. from the wireless device to the base station.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G).

QUIC is a User Datagram Protocol (UDP) based stream-multiplexed and secure transport protocol with integrity protected header and encrypted payload. Unlike the traditional transport protocol stack using Transmission Control Protocol (TCP), which resides in the operating system kernel, QUIC can easily be implemented in the application layer. This brings lots of flexibility in terms of evolution, congestion control and implementation of new features. QUIC is work in progress at the Internet Engineering Task Force (IETF) organization, see e.g. "QUIC: A UDP-Based Multiplexed and Secure Transport", version 29 (draft-ietf-quic-transport-29) 10 Jun. 2020, and "Using TLS to Secure QUIC", version 29 (draft-ietf-quic-tls-29) 9 Jun. 2020.

QUIC is a likely candidate to become the main transport protocol in the User Plane in wireless communication networks and also other communication networks. It is expected that most web applications, which today run mainly over HTTP/HTTPS, will migrate to QUIC.

An important distinction between QUIC and TCP is that QUIC is an encrypted protocol. Protocols that run on top of TCP are commonly protected by the Transport Layer Security (TLS) protocol that provides protection of the payload but not of the TCP headers. QUIC on the other hand, provides protection of both payload and packet headers. A QUIC packet is protected using two separate keys, one for protecting the packet header and another for protecting the packet payload. Furthermore, a QUIC packet header consists of less fields than the TCP counterpart. Instead, QUIC makes use of frames that are part of the protected packet payload for transport related information such as acknowledgements.

QUIC allows for migration of a connection between different Internet Protocol (IP) addresses and ports. Such migration can happen implicitly e.g. due to rebinding of Network Address Translation (NAT) state or explicitly, e.g. because the client decides to use a separate access network as it becomes available.

Latency measurement is commonly performed by network nodes to understand properties of end-to-end flows that traverse the network as well as the behavior of the network segments the flows are traversing. The most common form of latency that is measured on end-to-end flows is, or is based on, packet Round-Trip-Time (RTT). RTT is usually defined as the time from transmitting a packet until receiving an acknowledgement of said packet.

As QUIC is an encrypted protocol, it is not possible for a passive observer, who is not an explicit part of a QUIC conversation, to see which acknowledgement refers to what packet. Therefore, it is not possible to measure RTT for QUIC in the same way as is being done for TCP.

The QUIC protocol defines a mechanism known as the spin bit, which is designed to allow on-path passive observers to measure RTT by observing the periods of changes of the spin bit values. However, this explicit signal is an optional part of the QUIC protocol and it cannot be assumed to always be present.

In wireless communication networks, latency measurements and RTT are important measures as well, and e.g. used to find out about current conditions in the network and thereby for example get indication if there is congestion or other problems, or potential such problems ahead, typically in the RAN, or parts thereof. The wireless communication network may be configured to take various actions based on latency measurements and RTT. For example, current congestion detection techniques use RTT as a primary source of information for determining the level of load in the RAN. Current congestion detection techniques will therefore not work when the observed traffic is not TCP-based or QUIC-based with enabled spin bit.

When data and data flows, e.g. containing streaming video, are provided by means of QUIC packets, it can thus be problems to estimate latency.

SUMMARY

In view of the above, an object is to provide one or more improvements in relation to the prior art, in particular to provide improvements regarding estimation of latency over a communication path in a communication network, and that would work also when data packets are QUIC packets.

According to a first aspect of embodiments herein, the object is achieved by a method, performed by one or more devices, for supporting estimation of latency over a communication path in a communication network between a data flow shaping node and a probe node. The communication path comprises a data flow target node configured to receive a data flow from a data flow source node via the communication path. The data flow shaping node being configured to provide the data flow in bursts towards the data flow target node. The device(s) initiate to transmit, by the data flow shaping node, a sample burst being a burst of said bursts that differs in a predefined manner from preceding and subsequent bursts so that the data flow target node in response to the sample burst transmits a certain pattern of acknowledgement packets that differs compared to patterns of acknowledgement packets transmitted by the data flow target node in response to said preceding and subsequent bursts. The device(s) further initiates to identify, by the probe node, receipt of potential acknowledgement packets according to said certain pattern.

According to a second aspect of embodiments herein, the object is achieved by one or more devices for supporting estimation of latency over a communication path in a communication network between a data flow shaping node and a probe node. The communication path comprising a data flow target node configured to receive a data flow from a data flow source node via the communication path. The data flow shaping node being configured to provide the data flow in bursts towards the data flow target node. The device(s) is configured to initiate to transmit, by the data flow shaping node, a sample burst being a burst of said bursts that differs in a predefined manner from preceding and subsequent bursts so that the data flow target node in response to the sample burst transmits a certain pattern of acknowledgement packets that differs compared to patterns of acknowledgement packets transmitted by the data flow target node in response to said preceding and subsequent bursts. The device(s) is further configured to initiate to identify, by the probe node, receipt of potential acknowledgement packets according to said certain pattern.

The device(s) may then, or may be configured to, initiate to determine an estimate of the latency based on timing information regarding transmission of the sample burst and receipt by the probe node of said identified potential acknowledgement packets.

In some embodiments the probe node is the data shaping node and the communication path correspond to a round trip and the estimation of latency may correspond to computation of Round Trip time (RTT).

By identification of said certain pattern among potential acknowledgement packets these packets are most likely the actual acknowledgement packets and the risk of mixing acknowledgement packets between bursts can also be avoided. It can even be found out what exact data packet of the sample burst did generate a certain acknowledgement packet of the pattern. This means that latency can be estimated. Thus embodiments herein support estimation of latency that work also when data packets are QUIC packets without spin bit.

A further advantage with embodiments herein is that the sample burst as such, i.e. above packet level, e.g. its data rate, length etc., need not be affected or changed compared to conventional bursts. The sample burst may thus look the same as the preceding and subsequent bursts since only e.g. the order of data packets may have changed. This means that undesirable shaping can be avoided when implementing embodiments herein.

Hence, embodiments herein support estimation of latency, e.g. computation of RTT, that work also when data packets are QUIC packets without spin bit.

BRIEF DESCRIPTION OF THE DRAWINGS

Examples of embodiments herein are described in more detail with reference to the appended schematic drawings, which are briefly described in the following.

DETAILED DESCRIPTION

Figure 1:
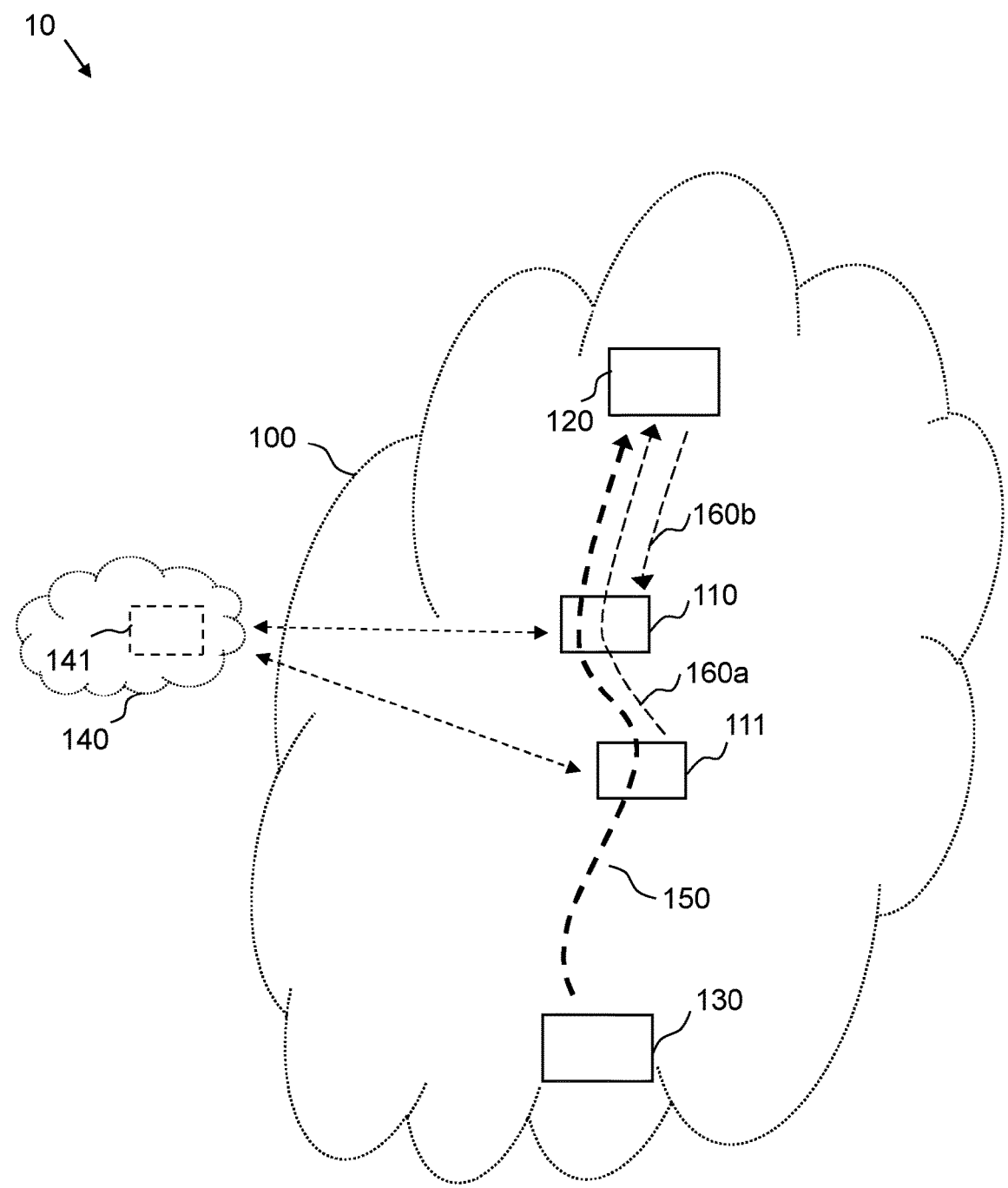
FIG. 1 is a block diagram schematically depicting an example of a first communication system to be used for discussing embodiments herein.

Throughout the following description similar reference numerals may be used to denote similar elements, units, modules, circuits, nodes, parts, items or features, when applicable. Features that appear only in some embodiments are, when embodiments are illustrated in a figure, typically indicated by dashed lines.

Embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

As a development towards embodiments herein, some ideas underlying embodiments herein will first be discussed.

To deliver traffic, i.e. data, from hosts, e.g. servers, to clients, e.g. wireless communication devices, data shaping is often applied. It is e.g. common practice in cellular networks to perform throttling of Adaptive BitRate (ABR) video flows. A node in communication network, e.g. CN, or in a Local Area Network (LAN), detects flows that deliver video of ABR characteristic and shapes the set of flows to a configured bitrate. Shaping of ABR video flows has the potential of causing a reduction of volume consumed by the video service carried by the flows. An ABR client may continuously estimate the downlink bandwidth and selects a video resolution that best matches the available bandwidth.

For a wireless communication network, the volume reduction that can be achieved by shaping video is most useful when the RAN is under high load. Therefore, it is common for network nodes that perform shaping to be also be associated with a load or congestion detection mechanism. Such a mechanism usually uses RTT-based latency estimates as primary source of information to determine the load level in RAN.

When shaping traffic, e.g. in wireless communication networks, e.g. cellular and/or telecommunication networks, it has turned out to be beneficial to transmit data in large bursts consisting of several Maximum Transmission Unit (MTU) sized packets at a time, i.e. transmitting the data at transmission periods with silence periods in between. A benefit of sending data in bursts is that it mitigates some negative impacts on RAN throughput metrics that are commonly observed when transmitting shaped data packet by packet or in small bursts. Furthermore, there are shaping techniques that mitigate the impact of large flows of data on loaded RANs by transmitting the data in bursts. The burst are typically formed by a downstream node or device, i.e. the data stream is transformed into the bursts, e.g. a node or device in the CN or RAN may correspond to data flow shaper or data flow shaping node and may be configured to convert a received data flow into burst for further delivery to the client, such as a wireless device.

Embodiments herein may in a simplified way be described as utilizing the presence of and/or the ability to form bursts, e.g. when there is a data shaping node in a communication network configured to shape data flows into bursts, to find out latency or a measure thereof, e.g. RTT, in a network part where the bursts are delivered, e.g. the RAN, and do this in a manner that works also in the case of QUIC packets.

FIG. 1 is a block diagram schematically depicting an example of a first communication system 10 to be used for discussing embodiments herein and in which embodiments herein may be implemented. The first communication system 10 comprises a communication network 100 that may be or be based on an IP network, or in other words, a data communication network based on, such as implemented to support, the Internet Protocol, e.g. version 4 or version 6, i.e. IPv4 or IPv6. The figure shows a client device 120 in the communication network 100, e.g. served by it and/or enabled to receive and/or transmit data traffic in and/or via the communication network 100. The figure further shows a server device 130, e.g. a host device, that for example provides data for communication to/from the client device 120, such as media for streaming, e.g. audio and/or video data, via the communication network 100. The figure further schematically illustrates a data flow 150 from the server device 130, in and via the communication network 100, to the client device 120. The data flow 150 may comprise said data provided by the server device 130. The client device 120 is thus here an example of a data flow target node and the server device 130 is an example of a data flow source node.

Further, a communication path 160*a-b* is shown between a data flow shaping node 111 and a probe node 110. As should be understood, the data flow shaping node 111 may be such data shaping node mentioned above that may be present for forming of bursts. The probe node 110 may be a separate or same node as the data flow shaping node 111.

In the figure it is also shown a remote device 141, e.g. remote network node, and a remote computer network 140 that the remote device 141 may be part of or connected to The remote computer network 140 may correspond to a so called computer cloud, or simply cloud, providing certain services. The remote device 141 and/or remote network 140 may e.g. be communicatively connected to the multi-access communication network 100 and e.g. the prober node 110 and/or the data flow shaping node 111, as illustrated in the figure.

Figure 2:
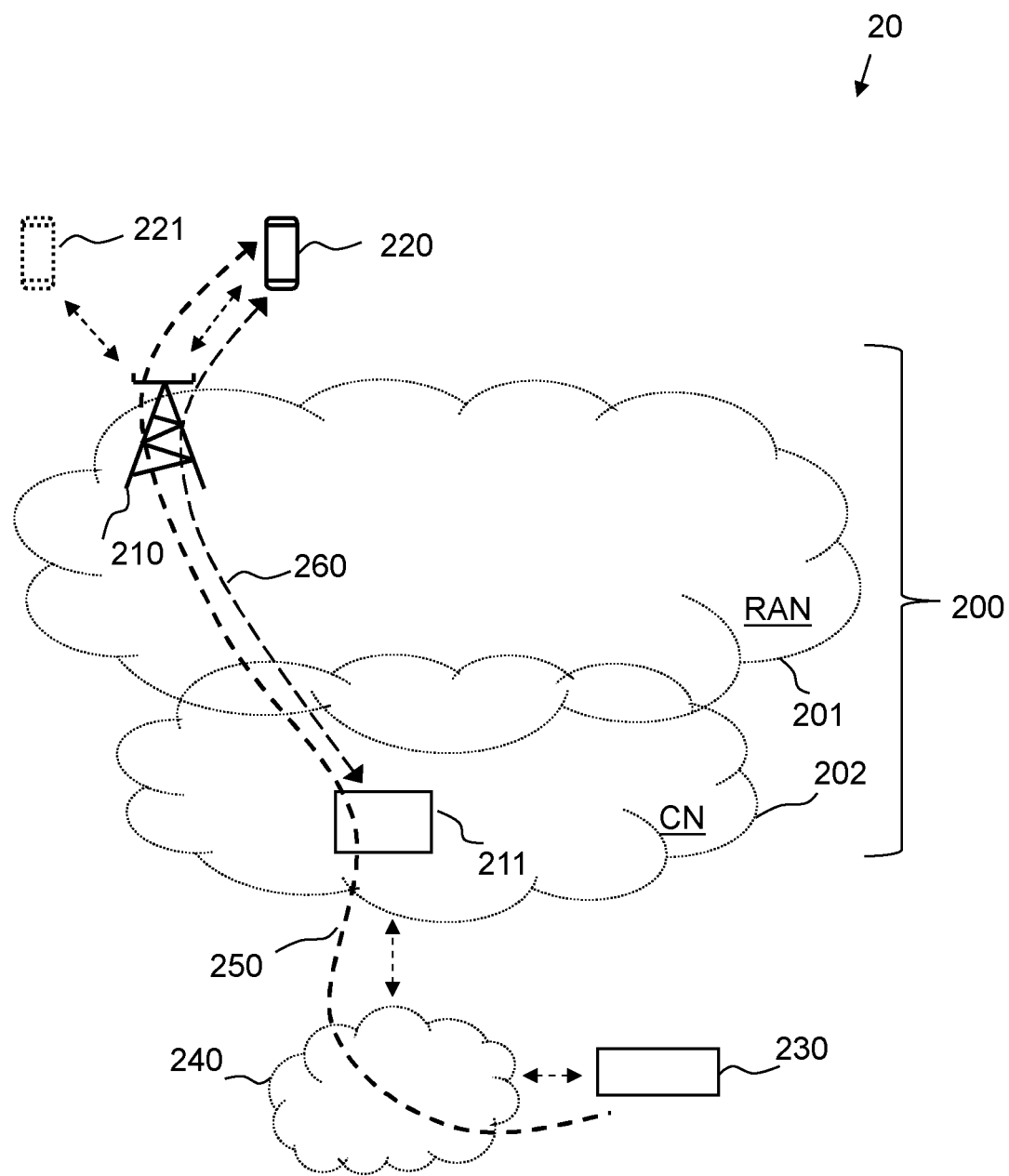
FIG. 2 is another block diagram schematically depicting an example of a second communication system to be used for discussing embodiments herein FIG. 3 schematically illustrates an example of how a data flow can be shaped and be transmitted in bursts.

FIG. 2 is a block diagram schematically depicting an example of a second communication system 20 to be used for discussing embodiments herein and in which embodiments herein may be implemented. The second communication system 20 comprises a wireless communication network 200, e.g. a telecommunication network. The wireless communication network 200 may comprise a Radio Access Network (RAN) 201 part and a core network (CN) 202 part. The wireless communication network 200 is typically a telecommunication network or system, such as a cellular communication network that supports at least one Radio Access Technology (RAT), e.g. LTE, or 4G, New Radio (NR) that also may be referred to as 5G.

The wireless communication network 200 comprises network nodes that are communicatively interconnected. The network nodes may be logical and/or physical and are located in one or more physical devices. The wireless communication network 200, typically the RAN 201, may comprise a radio network node 210, i.e. a network node being or comprising a radio transmitting network node, such as base station, and/or that are being or comprising a controlling node that controls one or more radio transmitting network nodes. Said radio network node may e.g. be communicatively connected, such as configured to communicate, over, or via, a so called X2-U communication interface or communication link with other radio network nodes (not shown) comprised in the RAN.

Further, the shown wireless communication network 200, e.g. the CN 202, comprise a network node 211, e.g. a core network node, such as a Packet GateWay (P-GW) in LTE/4G or User Plane Function (UPF) node in NR/5G, that may be communicatively connected, such as configured to communicate, over, or via, a communication interface or communication link, such as the so called so called S1-U, with radio network nodes of the RAN 201, e.g. with the radio network node 210. The network node 211 should here correspond to a data shaping node, i.e. a node with ability, e.g. configured to, to transform a data flow it receives into bursts for further transmission. In other words, it may correspond to the data flow shaping node 111 but in the context of a wireless communication network.

S1-U, X2-U are IP/UDP based and are examples of user plane protocols used in e.g. LTE and NR wireless communication networks. These user plane protocols can be considered to correspond to application layer protocols in terms of a IP network in general.

Hence, the wireless communication network 200 can be considered to be based on and/or comprise one or more IP networks. For example, the radio network node 210 may be communicatively connected, e.g. via X2-U, to another radio network node in an IP network part of the RAN 201. Moreover, the network node 210 may be communicatively connected, e.g. via S1-U, to the network node 211. This connection is in an IP network of the wireless communication network 200 that connects the RAN 201 and CN 202.

The wireless communication network 200, or specifically one or more network nodes thereof, e.g. the radio network node 210, is typically configured to serve and/or control and/or manage one or more wireless communication devices, such as a first communication device 220 and a second communication device 221, in radio coverage areas, i.e. an area where radio coverage is provided for communication with one or more communication devices. The communication device 220 may alternatively be named a wireless communication device, or simply wireless device, and it may correspond to a User Equipment (UE). Each radio coverage may be provided by and/or associated with a particular Radio Access Technology (RAT). The radio coverage may be radio coverage of a radio beam, that simply may be named a beam. As should be recognized by the skilled person, a beam is a more dynamic and relatively narrow and directional radio coverage compared to a conventional cell, and may be accomplished by so called beamforming. A beam is typically for serving one or a few communication devices at the same time, and may be specifically set up for serving this one or few communication devices. The beam may be changed dynamically by beamforming to provide desirable coverage for the one or more communication devices being served by the beam. There may be more than one beam provided by one and the same network node.

The wireless communication network, e.g. the CN 202 thereof, may further be communicatively connected to, e.g. via the core network node 212, and thereby e.g. provide access for said communication device 220, to an external network 240, e.g. the Internet. The external network 240 comprise and are connected to further network nodes, e.g. an external network node 230. External here refers to external vs. the wireless communication network 200. The external network node 230 may e.g. correspond to a server providing service(s) to one or more other internet connected devices, e.g. the first communication device 220 that may be provided with access to the external network 230, such as the Internet, via the wireless communication network 200, e.g. specifically via the core network node 220 as mentioned above. The first communication device 220 may thus be communicatively connected, e.g. by means of TCP/UDP/IP and an application layer protocol, via the wireless communication network 200 and the external network 240, with the external network node 230. A data flow 250, as indicated in the figure by a dotted line, may e.g. be provided from the external network node 230, via the external network 240 and the wireless communication network 200, to the first communication device 220. The external network node 230 may e.g. be a server providing a video streaming service accessed via an application, or app, executing on the first communication device 220. A similar situation could arise with another or the same communication device that is connected to the Internet via a Local Area Network (LAN), e.g. a WiFi network at home, instead of to the wireless communication network 200, e.g. 5G, as discussed above.

Further, a communication path 260 is shown from the network node 211 to the first client device and back again.

In comparison with FIG. 1, the first communication device 220 may be considered to correspond to the client device 120 and thus be example of a data flow target node, the wireless communication network 200, possibly together with the external network 240, may be considered to correspond to the communication network 100, and the network node 211 may be considered to correspond to the data flow shaping node 111 and the probe node 110. The external network node 230 may be consider to correspond to the server device 130, the data flow 250 to the data flow 150 and the communication path 260 to the communication path 160a-b, at least in the situation when the probe node 110 and the data flow shaping node 111 are the same node.

It may be noted that a server, e.g. a device or network node, corresponding to the server device 130 or the external network node 230 or external network 240, in practice may correspond to one or more physical nodes or devices, e.g. associated with a service through or from which the data flow, e.g. 150 or 250, is provided. The server may alternatively be termed e.g. a host computer, a server system or communication system.

Attention is drawn to that FIG. 1 and FIG. 2 are only schematic and for exemplifying purpose and that not everything shown in the figured may be required for all embodiments herein, as should be evident to the skilled person. Also, a communication network and wireless communication network that correspond(s) to the ones shown in the figures will typically comprise several further device, network nodes and details, as realized by the skilled person, but which are not shown herein for the sake of simplifying.

Figure 3:
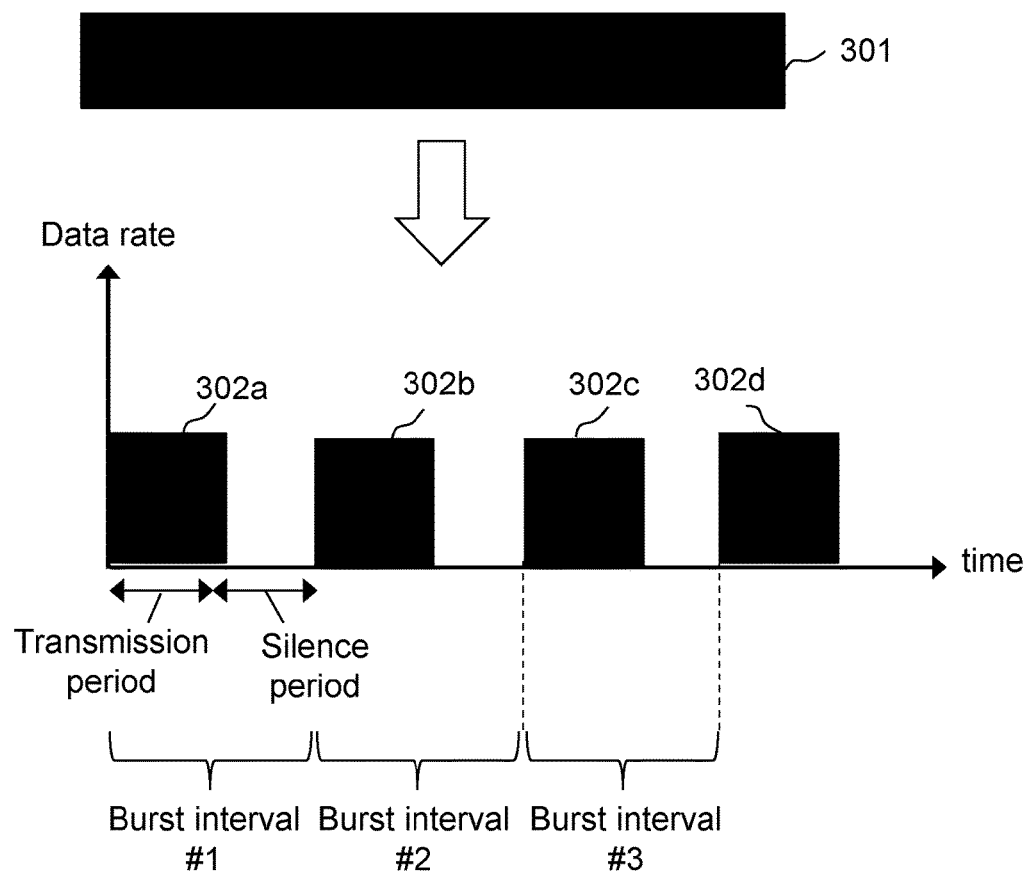

FIG. 3 schematically illustrates an example of how a data flow can be shaped and be transmitted in bursts, i.e. illustrates what already has been described above. What is shown is how data 301 of a dataflow, e.g. of any of the data flows 150, 250, can be transmitted in data bursts 302a-d. Note that data 301 in the figure is schematic and can be considered to show a data amount. In practice when data is received over time, the data rate will vary. The shaping of the data 301 into the bursts may e.g. be performed by the data shaping node 111 or the network node 211. As can be seen in the figure, the data in a burst is transmitted under a transmission period that is followed by silence period until data transmission of the next burst in time, i.e. of the subsequent burst, is taking part.

A burst interval, i.e. time between bursts, may be named a burst interval and thus corresponds to the transmission period and the silence period. For example, the burst interval of the shown first burst 302a is the burst interval #1 etc. In the shown figure, the burst intervals appear the same between bursts, as well as the transmission periods, the silence periods and the burst bit rates during transmission. However, in practice there may be variation and the node providing the burst is typically configurable such that the burst intervals and/or transmission periods and/or silence periods and/or bit rates may change and vary between bursts if desirable.

QUIC is a reliable protocol where packets are acknowledged similarly to TCP. However, as already indicated above, a problem with QUIC is that it cannot be tracked exactly which packet(s) an acknowledgment is referring to. There are conditions however, where it is possible to deduce the RTT of a QUIC flow, i.e. data flow where data packets are QUIC packets. If the path between the point of measurement, i.e. where acknowledgement packets are received, such as at the probe node 110 or network node 211, and the receiver of the QUIC packets, e.g. the client device 120 or the first communication device 220, is empty, it is possible to calculate the time from when a set of packets is transmitted downstream to the receiver until another set of packets are observed in the reverse direction, i.e. upstream, from the receiver, which then can be assumed to be acknowledgement packets. This provides information that can be used to estimate latency. Such conditions and situation arise "naturally" e.g. when a connection is being established during the exchange of initial handshake packets and when a connection has been application limited, meaning that the application has stopped sending data to the network for some time. However, this is perhaps the only natural occurring situation that can be utilized "as is" for this purpose, but it is of course of interest to be able to estimate latency also at other occasions. Such condition as described may occur naturally also at other occasions, but it is conventionally difficult or impossible to know when, thus making it difficult to take advantage of this.

Embodiments herein may generally be considered based on manipulating some burst that else e.g. would be transmitted just as other bursts in a sequence, e.g. as shown in and discussed in relation to FIG. 3, e.g. manipulating burst 302b, so it become another type of burst that in contrast to a conventional burst, and of other bursts of the sequence, and thereby produces another pattern of acknowledgement packets, which pattern then can be identified. This way timing information about data packets of the burst generating the acknowledgement packets that were identified according to the pattern, and timing information regarding these identified acknowledgement packets, can be used to estimate latency, e.g. in the form of RTT using the time of data packet transmission by the data shaping node, e.g. 111 or 211, and time of acknowledgement packet receipt in the same node.

Further details, explanation and examples follow below.

When a QUIC endpoint, e.g. corresponding to a data flow target node, such as 120 or 220 in embodiments herein, receives packets in-order it generates one acknowledgement packet for every Nth packet, where N is commonly 2 or 10. In other words and in general, acknowledgement packets are not always sent by an endpoint for every received data packet, but for every received Nth data packet.

A data shaping node, e.g. 111 or 211, that sends packets in bursts can switch the order of a set of packets in that burst, so that the receiving end point, e.g. 120 or 220, will generate more acknowledgement packets than it would in the case of the burst being delivered in-order.

For example: Consider a burst of 10 packets "in order" [1,2,3,4,5,6,7,8,9,10] and a receiving endpoint that sends one acknowledgement for every 10 in-order packets. In the normal case, each burst will result in a single acknowledgement being sent in the reverse direction. However, the data shaping node may define, e.g. be configured to transmit, a sampling burst where the first two packets have a swapped order and the last two packets have a swapped order, i.e. [2,1,3,4,5,6,7,8,10,9]. For an endpoint that adheres to the principle of sending an immediate acknowledgment when receiving packets out of order this sequence would generate four acknowledgements instead of one. After having sent such sample burst the data shaping node may then start searching for corresponding acknowledgement patterns, e.g. monitoring for receipt of such. When an acknowledgement packet, or potential acknowledgement packet (since it may not always be for sure which packets are acknowledgement packets) is observed, i.e. is identified, after a sample burst has been sent, a match window timer may be started. If the expected acknowledgement pattern then is observed within the match window, e.g. that an expected number of acknowledgement packets received, it is considered a match and RTT can be calculated e.g. as the time from transmitting the burst until receiving the corresponding burst of acknowledgements.

Figure 4:
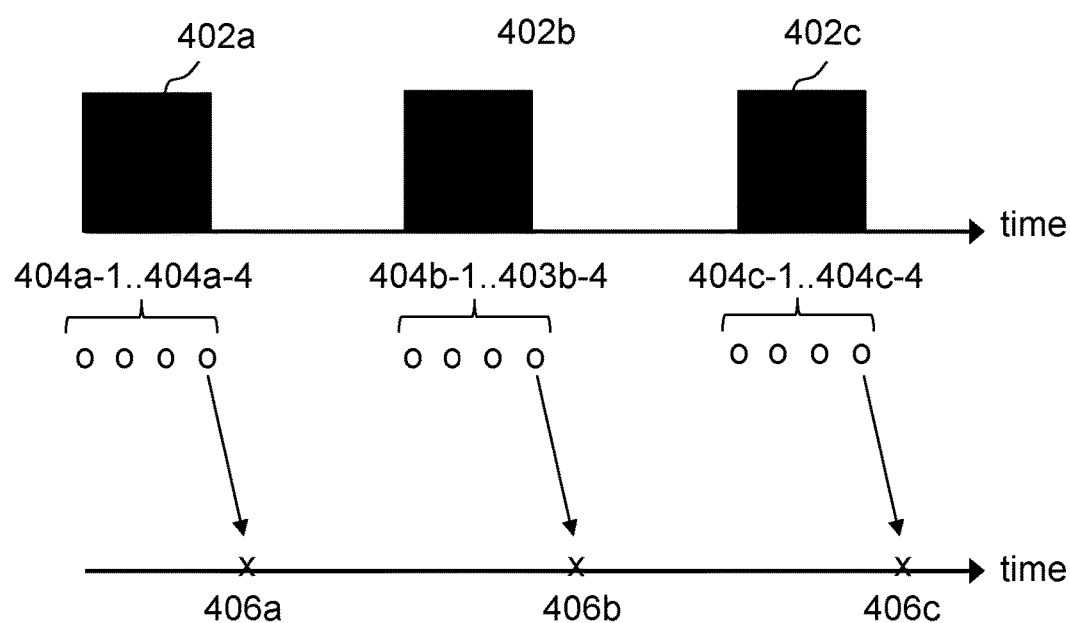
FIG. 4 schematically illustrates an example for explanation of how packets of a conventional burst can result in acknowledgement packets.

FIG. 4 exemplifies this and schematically illustrates an example for explanation of how packets of a conventional burst can result in acknowledgement packets. Three bursts 402a-c are shown and may e.g. correspond to bursts 302a-c. In the shown example, each burst consists of 4 data packets, burst 402a of data packets 404a-1 . . . 404a-4, burst 402b or data packets 404b-1 . . . 404b-4 and burst 402c of data packets 404c-1 . . . 404c-4. The data packets of each burst are transmitted in a certain numbered order and the endpoint expects receipt of data packets in this order. In the shown example, just to illustrate the principle, every 4th data packet generates an acknowledgement packet. That is the 4th packet of burst 402a, i.e. data packet 404a-4, generates an acknowledgement packet 406a, the 4th packet of burst 402b, i.e. data packet 404b-4, generates an acknowledgement packet 406b, and the 4th packet of burst 402c, i.e. data packet 404c-4, generates an acknowledgement packet 406c. To make sure that each burst can be acknowledged in full, data flow shaping nodes providing bursts, e.g. 111 or 211, are typically configured so that each burst consist of an integer number of N data packets, where N is the number of data packets per acknowledgement packet. One problem with a sequence of acknowledgement packets as in FIG. 4 is that it may be difficult to identify if a packet is an acknowledgement packet although this may be assumed under certain circumstances, but at least it can be identified if packet is a potential acknowledgement packet or not. However, even if it a packet can be identified as an acknowledgement packet or potential such packet, it may still a problem to identify which burst, and/or packet of burst, that such (potential) acknowledgement packet has been sent in response to, which is desirable to know for latency estimation and e.g. RTT computation. For example, although the example is simplified in FIG. 4, it is in principle not possible, e.g. in case of QUIC data packets, to know if acknowledgment packet 406b was sent in response to a data packet of burst 402a or 402b, and not possible to know which particular data packet that generated it.

When packets are received out of order, i.e. in an incorrect order, a QUIC endpoint will send immediate acknowledgements so that the sender gets quicker feedback that can help in potential loss recovery. This is the case also for other situations than with QUIC, that is, when every Nth packet normally should generate an acknowledgement. When this is the case, there is typically also a counter reset, and after reset of this counter it is required another N packets in correct order to generate an acknowledgement packet.

This can be utilized in implementation of embodiments herein and will be exemplified next.

Figure 5:
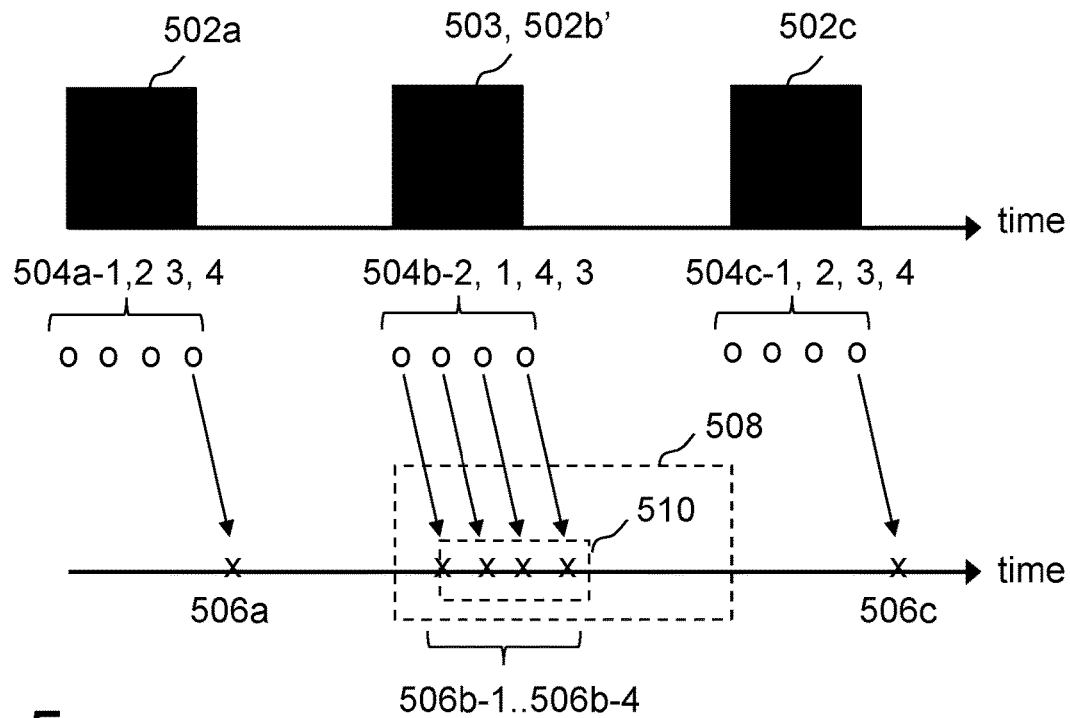
FIG. 5 schematically illustrates an example for explanation of how a sample burst with re-ordered packets according to some embodiments herein can result in a certain patter of acknowledgement packets.

FIG. 5 schematically illustrates an example for explanation of how a sample burst with re-ordered packets according to some embodiments herein can result in a certain pattern of acknowledgement packets. The example of FIG. 5 may be compared to the one in FIG. 4 and may result from manipulation of the burst 402b or forming of a burst with the data packets of that burst differently, while the other burst may remain the same as in FIG. 4. Hence, in FIG. 5, bursts 502a, 502c may correspond to bursts 402a, 402c, data packets 504a-1,2,3,4 may correspond to data packets 402a-1 . . . 4, data packets 504c-1,2,3,4 may correspond to data packets 402c-1 . . . 4, and acknowledgement packets 506a, 506c may correspond to acknowledgement packets 406a, 406c. To illustrate that the data packets of the data bursts 502a, 502c are, as conventionally, sent in a numbered, certain ordered sequence are written out in the figure, i.e. 1,2,3,4. Thus, similar as for FIG. 4, data packet 504a-4 of the sequence results in acknowledgement packet 506a etc.

However, as mentioned, there is also yet another burst, a sample burst 503, or 502b', that may be seen as a manipulated version of the burst 402b, i.e. of a normal or conventional burst. In the shown example the manipulation may involve a on purpose reorder of the order that the data packets of the burst else, and conventionally, would be transmitted, and thus a re-order, or change, of the order they were sent in the example of FIG. 4 and also compared to the order of data packets in the preceding and subsequent bursts 502a, 502c. In other words, instead of sending the data packets in a correct order, they are sent in an incorrect order on purpose. If it is assumed, and as indicated above, that the correct order is 1,2,3,4 of packets of a burst, the data packets of the sample burst 503 is instead in the incorrect order or sequence of 2,1,4,3, which is the reason these data packets are named data packets 504b-2, 1, 4, 3 in the figure. This has here been utilized to thereby force the endpoint to, in this example, transmit an acknowledgement packet for each one of the data packets of the sample burst 503. Since each data packet, when transmitted in the reorder 2,1,4,3, will be considered received in an incorrect order by the endpoint, e.g. any one of 120, 220, each will generate an acknowledgement packet. In other words, and as shown in the figure, instead of a single acknowledgement packet 406b as in FIG. 4, it is now transmitted 4 acknowledgement packets 506b-1 . . . 506b-4. It is realized that it is formed a distinguishable pattern of acknowledgement pattern thanks to this, compared to acknowledgement patterns sent in response to the preceding and subsequent bursts. This makes it possible to identify these acknowledgement packets as generated in response to the sample burst 503, and also identify that the first of these acknowledgement packets is the one transmitted in response to the first data packet of this burst.

In the figure it is also marked a sampling window 508 and a match window 510. Such are used for some embodiments herein to facilitate implementation. A more detailed explanation follow below, but in short the idea is that the sampling window 508 corresponds to a time range or interval associated with transmission of the sample burst 503, during which it is expected that potential acknowledgment packets, if any, sent in response to the sampling burst, shall be received. The match window is a window or windows within the sampling window and that starts at receipt of each potential acknowledgement packet. Their width, i.e. duration, is set based on how often and how many acknowledgement packets should be sent in response to the sample burst, that is here depending on how the re-order of data packets look like. The idea is that if a certain number of potential acknowledgement packets are received within a match window, this can be used to identify the expected pattern of acknowledgement packets in response to the sample burst, i.e. occurrence of acknowledgement packets sent in response to the sample burst. Although an expected pattern can be identified in many different ways, as realized by the skilled person, it is advantageous if it suffice to count a certain number of packet during a time interval to identify the pattern. Hence, in the shown example, the match window may be set so that if 4 potential acknowledgement packets are received during a certain time interval, e.g. based on the time for sending 4 data packets, this is taken as identification that these potential acknowledgement packets are acknowledgement sent in response to the sample burst.

Figure 6:
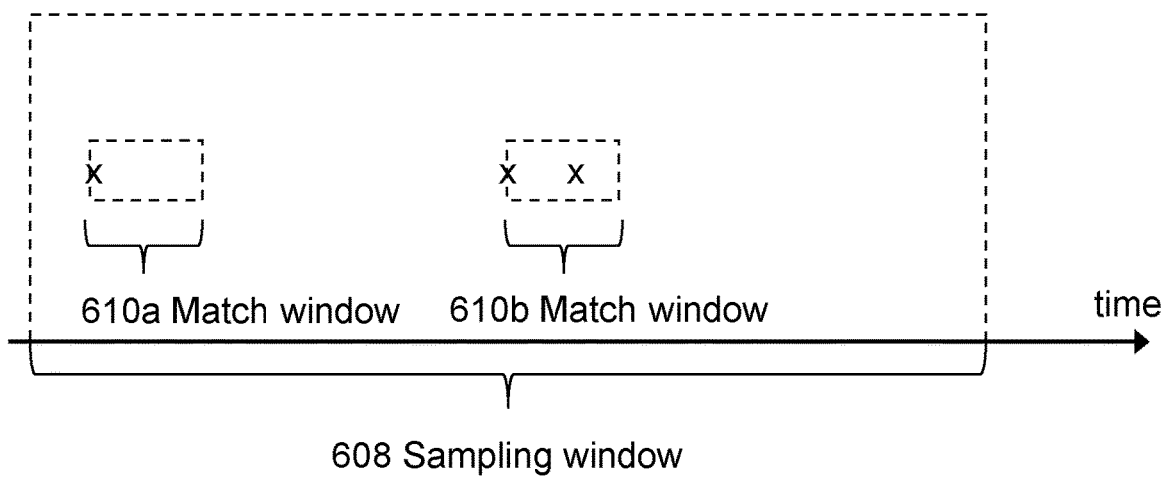
FIG. 6 schematically illustrates an example for further explanation of how sampling window and match window(s) may relate to each other and be used in embodiments herein.

FIG. 6 schematically illustrates a simplified example for further explanation of how sampling window and match window(s) may relate to each other and be used in embodiments herein. Here, a sampling window 608 is shown and within it, i.e. within the time range corresponding to the sampling window, it is shown two match windows 610a-b of equal size. Each match window starts when there is receipt of, or identification of received, potential acknowledgement packet. In the figure potential acknowledgement packets are indicated by x, i.e. just as in FIG. 5. The sampling window and match window are typically of predefined or predetermined length, and may have been predefined or predetermined based on one or more of the burst transmission period(s) used, the burst interval(s) used and the sample burst that is used to generate the pattern of acknowledgement packets to be identified. In the shown example, there may be data packets of bursts of a burst sequence so that each normal burst should result in only a single acknowledgement packet within the sampling window 610 and the sample burst, e.g. formed by re-ordered packets, should result in at least two acknowledgement packets within the match window. Hence, as shown in the example, within match window 610a it is only received a single potential acknowledgement packet, i.e. until the match window "times out", which is thus not sufficient for conclusion that the pattern has occurred, i.e. for identification of the pattern. However, within match widow 610b there is identified receipt of two potential acknowledgement packets and the conclusion is that the pattern has occurred, i.e. the expected pattern been identified. Since it is known from how the sample burst was formed which data packet of the sample burst that generated the first acknowledgement packet of the pattern, e.g. the time of transmission of this data packet and the time of receipt of the first acknowledgement packet of the pattern can be used to estimate latency. In case it is the same network node that transmitted the sample burst, e.g. the data shaping node, e.g. 111 or 211, that also received the acknowledgement packet, and the difference between time of transmission and time of receipt corresponds to RTT.

Figure 7:
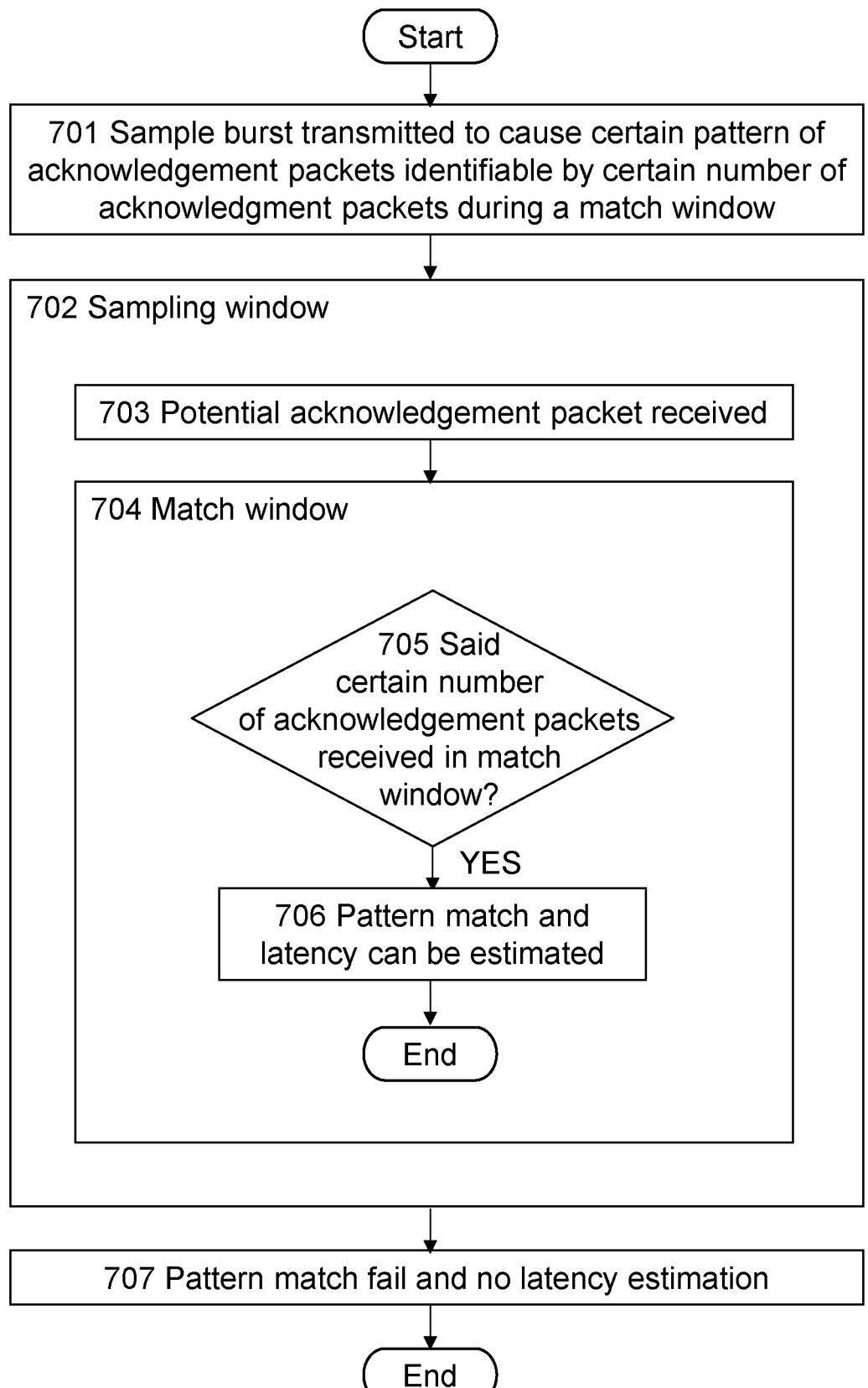
FIG. 7 is a flowchart for schematically illustrating an exemplary method according to some embodiments herein.

FIG. 7 is a flowchart for schematically illustrating an exemplary method according to some embodiments herein. The method is for latency estimation over a communication path, e.g. 160a-b or 260, in a communication network, e.g. 100 or 200. The communication path comprises, i.e. in the path it is located, a data flow target node, e.g. 120 or 220, configured to receive a data flow, e.g. 150 or 250, from a data flow source node, e.g. 130 or 230, via the communication path. The data flow shaping node being configured to provide the data flow in bursts towards the data flow target node.

Note that the actions discussed below in may be taken in any suitable order and/or be carried out fully or partly overlapping in time when this is possible and suitable. Also note that not all actions and features discussed below are necessarily present in all embodiments.

Action 701

The data flow shaping node transmits a sample burst to cause a certain pattern of acknowledgement packets that are identifiable by certain number of acknowledgment packets received during a match window.

Sample burst and match window may be as discussed above. The sample burst is part of a sequence of bursts transmitted by the data shaping node and may be a nominal or conventional burst of the sequence but where the data shaping node has changed how the sample burst is composed of data packets, e.g. changed the order of two or more data packets and/or removed packets of the burst. The sampling burst thus differs in a predefined manner from preceding and subsequent bursts of the burst sequence. The sampling burst is formed so that the data flow target node, in response to the sample burst, transmits said certain pattern of acknowledgement packets that thus differs compared to patterns of acknowledgement packets transmitted by the data flow target node in response to said preceding and subsequent bursts.

Action 702

It is initiated, e.g. started, a sampling window, such as explained above, which may involve starting a sampling window timer, i.e. a timer associated with the sampling window, that will run for a certain period corresponding to the length of the sampling window. The sampling window may correspond to such sampling window as explained above. This action is typically performed by the data shaping node.

Action 703

During the sampling window, i.e. while the window is open, such as before the timer associated with the sampling window has timed out, receipt of at least potential acknowledgement packets are being monitored for, e.g. as received by the data shaping node. Such monitoring may preferably be performed by the same node that receives the acknowledgement packets, e.g. the data shaping node. At some point a potential acknowledgement packet is received and there is identification of such receipt, e.g. by the data shaping node.

Action 704

Upon receipt of the potential acknowledgement packet in Action 703, i.e. in response to receipt of it, it is initiated, e.g. started, a match window, such as explained above, which may involve starting another timer that will run for a period corresponding to the length of the match window. The match window may correspond to such as explained above and thus have associated with it a certain number of acknowledgement packets that may be predetermined and/or determined by the sample burst.

Action 705

During the match window, i.e. while the window is open, such as before the timer associated with the match window has timed out, it is counted the number of received potential acknowledgement packets and checked if a certain number of them are received within the match window. Said certain number is predefined or predetermined and e.g. based on said certain pattern of acknowledgement pattern and also on the sample burst. Said certain number is typically predefined or predetermined together with the match window so that that said certain number of acknowledgement packets received within the match window will be the case for said pattern of acknowledgement packets, while there are fewer acknowledgement packets, e.g. only a single one, received within a match window when the acknowledgement packets are sent in response to a "normal" burst of the burst sequence, e.g. resulting from said preceding and subsequent bursts instead of the sample burst.

Action 706

If said certain number of acknowledgement packets are received during the match window there is thus a pattern match and latency can be estimated, e.g. RTT be calculated, as described above. The method may thereafter end but may be performed again for another, later sample burst. This way latency can be repeatedly estimated.

If the said certain number of acknowledgement packet is not reached during the match window and the sampling window has not yet timed out and there is received a new potential acknowledgement packet, a new match window is started, Action 704 is performed again etc.

Action 707

If there has been no pattern match when the sampling window times out, it may be concluded to be pattern match fail and no latency estimation be done.

In some embodiments, info from such "fail", and especially if it happens more than once with the same settings, may be used as input to change or adapt the sample bust, the sampling window and/or the match window. This way it can be tested and tried out different settings until a suitable sample burst, sampling window and match window, including the number of acknowledgment packets to be received within the match window, are applied, i.e. settings that result in pattern match and that can be used for latency estimation.

Figure 8:
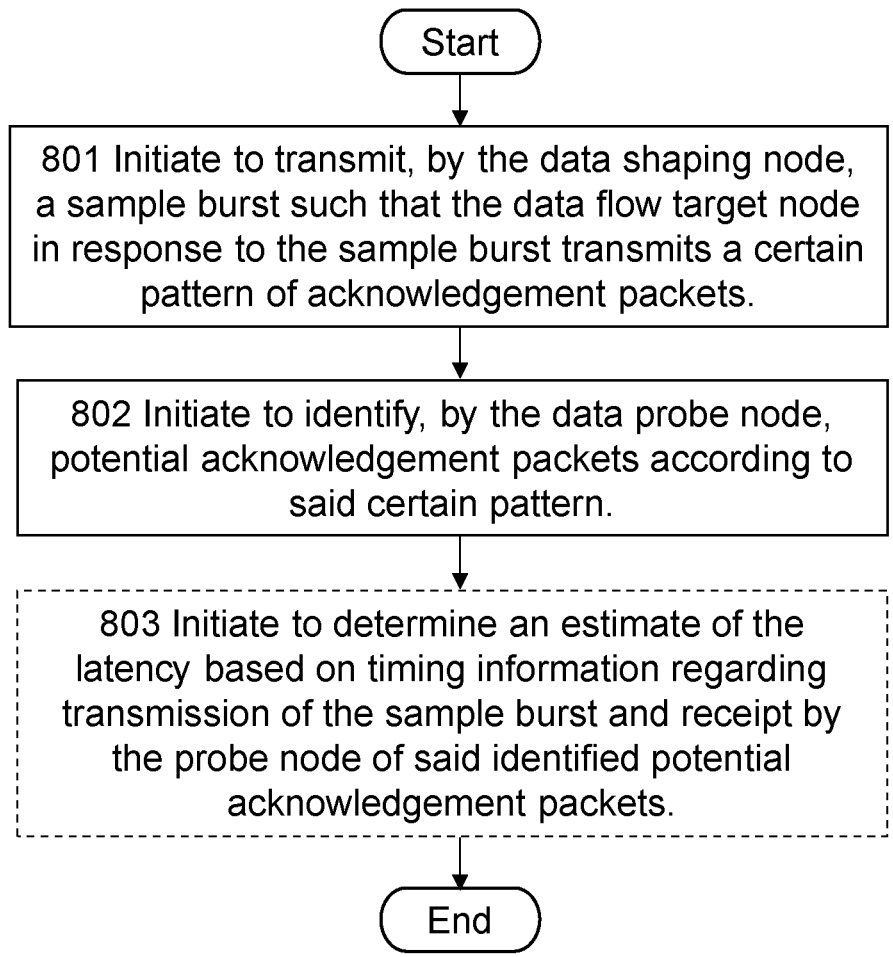
FIG. 8 is a flowchart for schematically illustrating a method according to embodiments herein.

FIG. 8 is a flowchart schematically illustrating embodiments of a method according to embodiments herein. The method is for supporting estimation of latency over a communication path, e.g. 160a-b or 260, in a communication network, e.g. 100 or 200, between a data flow shaping node, e.g. 111; 211, and a probe node. As already indicated above, the probe node may in principle be any node in the communication path, e.g. be the probe node 110, and may in some embodiments correspond to the radio network node 210, or the network node 211 and/or the data flow shaping node 111. The communication path, e.g. 160a-b; 260, comprises a data flow target node, e.g. 120; 220, configured to receive a data flow, e.g. 150; 250, from a data flow source node, e.g. 130; 230, via the communication path. The data flow shaping node, e.g. 111 or the network node 211, is configured to provide the data flow, e.g. 150; 250, in bursts towards the data flow target node, e.g. 120; 220. As should be recognized, a burst is transmitted during a burst interval associated with the burst, the burst interval having a transmission period with data transmission and a subsequent silence period without data transmission.

The method may be performed by one or more devices, that is device(s), e.g. by the first communication system 10 or the second communication system 20, and/or the data flow shaping node 111 or the network node 211, and/or the remote device 141 and/or the remote computer network 140.

Note that the actions below may be taken in any suitable order and/or be carried out fully or partly overlapping in time when this is possible and suitable.

Action 801

The device(s) initiate to transmit, by the data flow shaping node, e.g. 111; 211, a sample burst, e.g. 503, being a burst of said bursts that differs in a predefined manner from preceding and subsequent bursts, e.g. 502*a*, 502*c*, so that the data flow target node, e.g. 120; 220, in response to the sample burst transmits a certain pattern of acknowledgement packets that differs compared to patterns of acknowledgement packets transmitted by the data flow target node, e.g. 120; 220, in response to said preceding and subsequent bursts.

As should be realized, the preceding and subsequent bursts are bursts of the data flow and that are transmitted before and after the sample burst, respectively, typically closest before and after. An existing burst generating data flow shaping node may e.g. be controlled so that one or more bursts are transmitted, each corresponding to such sample burst as above. It can be predetermined or be learned by e.g. swapping order of packets and/or varying burst size, how many packets are needed to generate an acknowledgement packet. This knowledge can be utilized together with an assumption, as explained above, that every packet received in wrong order generate an acknowledgement packet, to form said certain pattern. However, alternative ways of producing said certain pattern, although not preferred, may be to remove and/or exchange some packets with packets of other content, e.g. dummy packets. Removing packet means that the data flow source node may have to resend packets, which typically is undesirable but may in some situations still be acceptable although other solutions may first be considered. Replacing packets with dummy packets is typically not desirable since the effect in principle may be the same as removing a packet and with the additional negative effect of also resulting in also further and unnecessary processing at the data flow target node. Dummy packets may also not be able to result in "extra" acknowledgement packets being sent as in the case of changed order since dummy packets may be dropped before that will happen, e.g. when being managed by the transport layer of QUIC.

In some embodiments, said sample burst differs in that at least two data packets of the sample burst are in an incorrect order. This may be accomplished by changing order data packets when they are to be transmitted as part of the sample burst. Changing order into incorrect order has the ability to generate acknowledgement packets and can thus be used to form said pattern with still all packets of the burst being transmitted so they can be used by the data flow target node. Changing order is also a comparatively simple operation, thus facilitating implementation of embodiments herein.

Said incorrect order may be accomplished by swapping place of two packets. Swapping order may be preferred for implementation reasons and is easily scalable, each swap enabling enforcement of two acknowledgement packets to be generated. The two packets swapping place may be consecutively occurring packets. This may be advantageous both for implementational reasons and since it can be used for generation of a useful pattern even when acknowledgement packets normally are transmitted as often as for every second received packet, i.e. this is a versatile and flexible solution to cause said certain pattern.

Said at least two packets may comprise the first transmitted packet of the sample burst. Normally the first packet of a burst does not generate an acknowledgement packet, which makes it advantageous if said certain pattern by this can be made to contain an acknowledgement packet generated by the first packet. It typically increases the possibility for an identifiable differing pattern for the sample burst.

Said at least two packets may comprise the last transmitted packet of the sample burst. Normally each burst consists of an integer multiple of the number of packets required to generate an acknowledgement packet and an acknowledgement counter may be "reset" by the last packet of the burst. However, when a different pattern of acknowledgement packets has been enforced by embodiments herein, i.e. by an incorrect order of packets of the sample burst, the acknowledgement packet counter may not be reset by the last packet, which then will affect the acknowledgement packet pattern of subsequent bursts. However, by as here involving the last packet of the sample burst so it in any case should generate an acknowledgement packet, this can be avoided and as a result it may also become easier to identify the differing pattern for the sample burst.

Action 802

The device(s) initiate to identify, by the probe node, e.g. 110; 211, receipt of potential acknowledgement packets according to said certain pattern.

By identification of said certain pattern among potential acknowledgement packets these packets are most likely the actual acknowledgement packets and the risk of mixing acknowledgement packets between bursts can also be avoided. It can even be found out what exact data packet of the sample burst did generate a certain acknowledgement packet of the pattern. This means that latency can be estimated. Thus embodiments herein support estimation of latency that work also when data packets are QUIC packets without spin bit. Note that the latency over the communication path corresponds to RTT when the probe node is the data shaping node.

A further advantage with embodiments herein is that the sample burst as such, i.e. above packet level, e.g. its data rate, length etc., need not be affected or changed compared to conventional bursts. The sample burst may thus look the same as the preceding and subsequent bursts since only e.g. the order of data packets may have changed. This means that undesirable shaping can be avoided when implementing embodiments herein.

In some embodiments, said identification of the potential acknowledgement packets according to said certain pattern is based on that the potential acknowledgement packets are received by the probe node during a sampling window, e.g. as discussed above. The sampling window may correspond to a first time interval or range that is predefined and covers a time period during which potential acknowledgement packets from the sample burst can be expected. Said sampling window may correspond to the burst interval associated with the sample burst, or a time interval starting at the start of the sample burst, e.g. at a time when the first acknowledgement packet for the sample burst can be expected to be received by the probe node, and ending at a time before acknowledgement packets for the closest subsequent burst can be expected to be received by the probe node.

Further, the identification of the acknowledgement packets according to said certain pattern may be based on identifying a certain number of acknowledgement packets within a match window, e.g. as discussed above. Said match window being a time window of a predefined duration and that starts with each acknowledgement packet received within the sampling window. Since the sample burst is formed as above, e.g. by packet in incorrect order, such as by swapping packets, this can be used to make sure that said certain pattern will comprise more acknowledgement packets per time unit compared to acknowledgement packets generated by normal busts, with data packets transmitted in correct order, such as the preceding and subsequent bursts. This circumstance is here exploited in that the match window thus may be set to a suitable time period during which only the sample burst should cause said certain number of acknowledgement packets. Thus the sample burst can be identified by receipt of said certain number of acknowledgement packets during the match window. This enable comparatively simple implementation of embodiments herein and fast execution since a e.g. counter can be used for implementation instead of any more advance, and typically computational heavy, pattern recognition algorithm.

Action 803

The device(s) may initiate to determine an estimate of the latency based on timing information regarding transmission of the sample burst, e.g. 503, and receipt by the probe node of said identified potential acknowledgement packets.

The estimate of the latency may be based on when one or more of the identified potential acknowledgement packets were received by the probe node and when one or more packets of the sample burst that caused said one or more identified potential acknowledgement packets were transmitted by the data flow shaping node.

As used herein, device(s) that initiates to perform an action, e.g. to transmit, refers to any pre-action and/or sub-action that causes or makes the action to be performed. The initiation, i.e. pre-action and/or sub-action, may be performed by the device that performs the action itself or another entity. A device that change from not performing an action to actively performing an action itself will include some initiation to perform the action, or in other words, initiate to perform an action is included in this case, i.e. when a device itself performs the action being initiated. Initiation of an action performed by another entity than performing the action itself may correspond to some signal provided or action performed by the other entity, e.g. trigger signal, that causes the device to perform the action. As mentioned, in some embodiments the method, and/or some or all actions thereof, is/are e.g. performed by the data flow shaping node 111 or the network node 211, and/or the remote device 141 and/or the remote computer network 140, e.g. a computer cloud, and embodiment herein may then for example, at least partly, be initiated by or provided as a cloud service. In case the method and/or some or all actions thereof are performed by one or more nodes part of e.g. the communication network 100 or wireless communication network 200, e.g. a node corresponding to the data flow shaping node 111 or the network node 211, the node(s) thereof performing respective action is typically also performing what is being initiated, e.g. the data flow shaping node 111 or the network node 211 may identify receipt of the potential acknowledgement packets in Action 802 and/or determine the estimate of the latency in Action 803.

Figure 9:
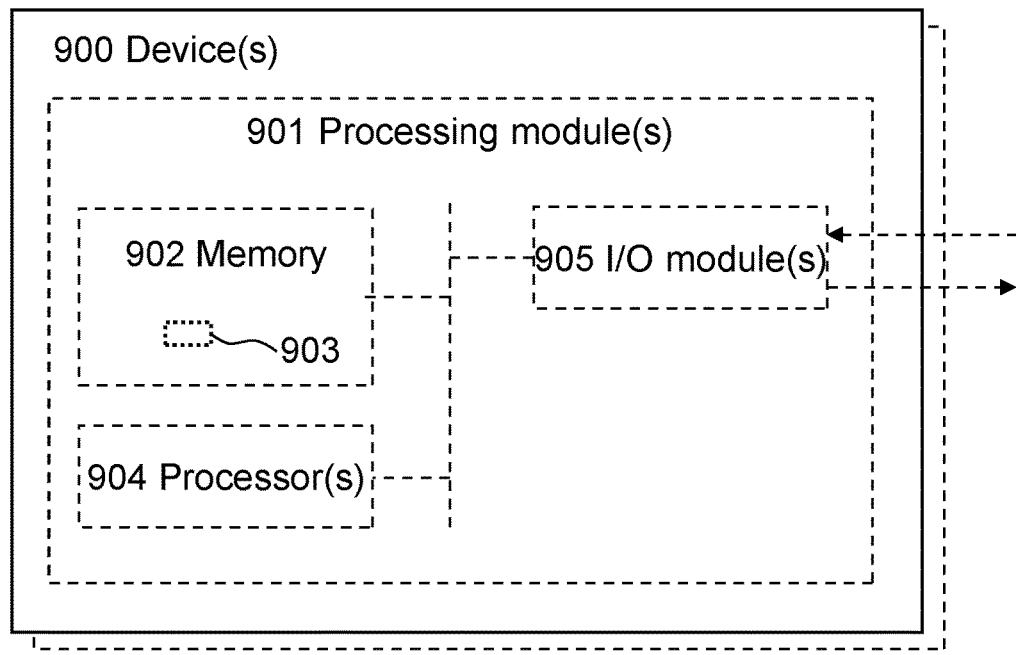
FIG. 9 is a schematic block diagram for illustrating embodiments of how one or more devices may be configured to perform the first method.

FIG. 9 is a schematic block diagram for illustrating embodiments of how one or more devices 900, e.g. said one or more devices discussed above in connection with FIG. 8, may be configured to perform the method and actions discussed above in connection with FIG. 8.

Hence, the device(s) 900 is for supporting estimation of latency over said communication path, e.g. 160a-b; 260, in the communication network, e.g. 100; 200, between the data flow shaping node, e.g. 111; 211, and the probe node, e.g. 110; 210; 111; 211. The communication path comprising the data flow target node, e.g. 120; 220, configured to receive the data flow, e.g. 150; 250, from the data flow source node, e.g. 130; 230, via the communication path. The data flow shaping node being configured to provide the data flow in bursts towards the data flow target node.

The device(s) 900 may comprise a processing module(s) 901, such as a means, one or more hardware modules, including e.g. one or more processors, and/or one or more software modules for performing said method and/or actions.

The device(s) 900 may further comprise memory 902 that may comprise, such as contain or store, computer program(s) 903. The computer program(s) 903 comprises 'instructions' or 'code' directly or indirectly executable by the device(s) 900 to perform said method and/or actions. The memory 902 may comprise one or more memory units and may further be arranged to store data, such as configurations and/or applications involved in or for performing functions and actions of embodiments herein.

Moreover, the device(s) 900 may comprise processor(s) 904, i.e. one or more processors, as exemplifying hardware module(s) and may comprise or correspond to one or more processing circuits. In some embodiments, the processing module(s) 901 may comprise, e.g. 'be embodied in the form of' or 'realized by' processor(s) 904. In these embodiments, the memory 902 may comprise the computer program(s) 903 executable by the processor(s) 904, whereby the device(s) 900 is operative, or configured, to perform said method and/or actions thereof.

Typically the device(s) 900, e.g. the processing module(s) 901, comprises Input/Output (I/O) module(s) 905, configured to be involved in, e.g. by performing, any communication to and/or from other units and/or devices, such as sending and/or receiving information to and/or from other devices, e.g. receiving from the server device 130 and sending towards the client device 120. The I/O module(s) 905 may be exemplified by obtaining, e.g. receiving, module(s) and/or providing, e.g. sending, module(s), when applicable.

Further, in some embodiments, the device(s) 900, e.g. the processing module(s) 901, comprises one or more of an initiating module(s), identifying module(s), and determining module(s), as exemplifying hardware and/or software module(s) for carrying out actions of embodiments herein. These modules may be fully or partly implemented by the processor(s) 904.

Hence:

The device(s) 900, and/or the processing module(s) 901, and/or the processor(s) 904, and/or the I/O module(s) 905, and/or the initiating module(s), and/or the transmitting module(s) may be operative, or configured, to initiate to transmit, by the data flow shaping node, said sample burst.

Further, the device(s) 900, and/or the processing module(s) 901, and/or the processor(s) 904, and/or the I/O module(s) 905, and/or the initiating module(s), and/or the identifying module(s) may be operative, or configured, to initiate to identify, by the probe node, said receipt of said potential acknowledgement packets according to said certain pattern.

Moreover, the device(s) 900, and/or the processing module(s) 901, and/or the processor(s) 904, and/or the I/O module(s) 905, and/or the initiating module(s), and/or the determining module(s) may also be operative, or configured, to initiate to determine said estimate of the latency based on said timing information.

Figure 10:
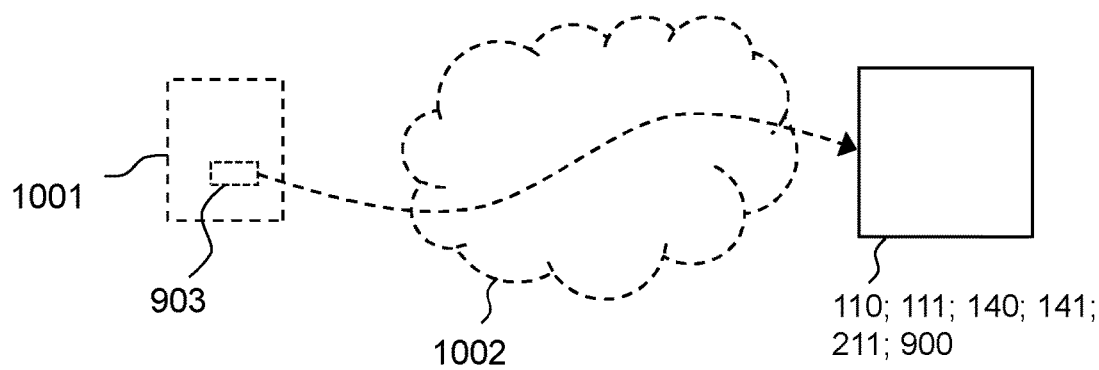
FIG. 10 is a schematic drawing illustrating some embodiments relating to computer program and carriers thereof to cause device(s) to perform said first method and related actions.

FIG. 10 is a schematic drawing illustrating some embodiments relating to computer program(s) and carriers thereof to cause said device(s) 900 discussed above to perform said method and related actions. The computer program(s) may be the computer program(s) 903 and comprises instructions that when executed by the processor(s) 904 and/or the processing module(s) 901, cause the device(s) 900 to perform as described above. In some embodiments there is provided a carrier, or more specifically a data carrier, e.g. a computer program product, comprising the computer program(s). The carrier may be one of electronic signal(s), optical signal(s), radio signal(s), and computer readable storage medium or media, e.g. computer readable storage medium or media 1001 as schematically illustrated in the figure. The computer program(s) 903 may thus be stored on the computer readable storage medium 1001. By carrier(s) may be excluded a transitory, propagating signal and data carrier(s) may correspondingly be named non-transitory data carrier(s). Non-limiting examples of the data carrier(s) being a computer readable storage medium o media is memory card(s) or memory stick(s), a disc storage medium or media such as CD(s) or DVD(s) or a mass storage device(s), e.g. based on hard drive(s) or Solid State Drive(s) (SSD). The computer readable storage medium or media 1001 may be used for storing data accessible over a computer network 1002, e.g. the Internet or a Local Area Network (LAN). The computer program(s) 903 may furthermore be provided as pure computer program(s) or comprised in a file or files. The file or files may be stored on the computer readable storage medium or media 1001 and e.g. available through download e.g. over the computer network 1002 as indicated in the figure, e.g. via a server. The server may e.g. be a web or File Transfer Protocol (FTP) server. The file or files may e.g. be executable files for direct or indirect download to and execution on said device(s) 900 to make it perform as described above, e.g. by execution by the processor(s) 904. The file or files may also or alternatively be for intermediate download and compilation involving the same or another processor(s) to make them executable before further download and execution causing said device(s) 900 to perform as described above.

Note that any processing module(s) and circuit(s) mentioned in the foregoing may be implemented as a software and/or hardware module, e.g. in existing hardware and/or as an Application Specific Integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the node(s) and device(s) to be configured to and/or to perform the above-described methods and actions.

Identification by any identifier herein may be implicit or explicit. The identification may be unique in a certain context, e.g. in the wireless communication network or at least in a relevant part or area thereof.

The term "network node" or simply "node" as used herein may as such refer to any type of node that may communicate with another node in and be comprised in a communication network, e.g. IP network or wireless communication network. Further, such node may be or be comprised in a radio network node (described below) or any network node, which e.g. may communicate with a radio network node. Examples of such network nodes include any radio network node, a core network node, Operations & Maintenance (O&M), Operations Support Systems (OSS), Self-Organizing Network (SON) node, etc.

The term "radio network node" as may be used herein may as such refer to any type of network node for serving a wireless communication device, e.g. a so called User Equipment or UE, and/or that are connected to other network node(s) or network element(s) or any radio node from which a wireless communication device receives signals from. Examples of radio network nodes are Node B, Base Station (BS), Multi-Standard Radio (MSR) node such as MSR BS, eNB, eNodeB, gNB, network controller, RNC, Base Station Controller (BSC), relay, donor node controlling relay, Base Transceiver Station (BTS), Access Point (AP), New Radio (NR) node, transmission point, transmission node, node in distributed antenna system (DAS) etc.

Each of the terms "wireless communication device", "user equipment" and "UE", as may be used herein, may as such refer to any type of wireless device arranged to communicate with a radio network node in a wireless, cellular and/or mobile communication system, and may thus be referred to as a wireless communication device. Examples include: target devices, device to device UE, device for Machine Type of Communication (MTC), machine type UE or UE capable of machine to machine (M2M) communication, Personal Digital Assistant (PDA), tablet, mobile, terminals, smart phone, Laptop Embedded Equipment (LEE), Laptop Mounted Equipment (LME), Universal Serial Bus (USB) dongles etc.

While some terms are used frequently herein for convenience, or in the context of examples involving other a certain, e.g. 3GPP or other standard related, nomenclature, it must be appreciated that such term as such is non-limiting Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, random access memory (RAM) or the like. Furthermore, the memory may be an internal register memory of a processor.

Also note that any enumerating terminology such as first device or node, second device or node, first base station, second base station, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described preferred embodiments. Various alternatives, modifications and equivalents may be used.

Therefore, the above embodiments should not be taken as limiting the scope of the present disclosure, which is defined by the appending claims.

The invention claimed is:

1. A method, performed by one or more devices, for supporting estimation of latency over a communication path in a communication network between a data flow shaping node and a probe node, which communication path comprises a data flow target node configured to receive a data flow from a data flow source node via the communication path, the data flow shaping node being configured to provide the data flow in bursts towards the data flow target node, wherein the method comprises:
   initiating to transmit, by the data flow shaping node, a sample burst being a burst of said bursts that differs in a predefined manner from preceding and subsequent bursts so that the data flow target node in response to the sample burst transmits a certain pattern of acknowledgement packets that differs compared to patterns of acknowledgement packets transmitted by the data flow target node in response to said preceding and subsequent bursts, and
   initiating to identify, by the probe node, receipt of potential acknowledgement packets according to said certain pattern.

2. The method as claimed in claim 1, wherein the method further comprises:
   initiating to determine an estimate of the latency based on timing information regarding transmission of the sample burst and receipt by the probe node of said identified potential acknowledgement packets.

3. The method as claimed in claim 2, wherein the estimate of the latency is based on when one or more of the identified potential acknowledgement packets were received by the probe node and when one or more packets of the sample burst that caused said one or more identified potential acknowledgement packets were transmitted by the data flow shaping node.

4. The method as claimed in claim 1, wherein said sample burst differs in that at least two data packets of the sample burst are in an incorrect order.

5. The method as claimed in claim 4, wherein said incorrect order is accomplished by swapping place of two packets.

6. The method as claimed in claim 5, wherein the two packets swapping place are consecutively occurring packets.

7. The method as claimed in claim 4, wherein said at least two packets comprise the first transmitted packet of the sample burst.

8. The method as claimed in claim 4, wherein said at least two packets comprise the last transmitted packet of the sample burst.

9. The method as claimed in claim 1, wherein the identification of the potential acknowledgement packets according to said certain pattern is based on that the potential acknowledgement packets are received by the probe node during a sampling window, said sampling window corresponding to a first time interval that is predefined and covers a time period during which potential acknowledgement packets from the sample burst can be expected.

10. The method as claimed in claim 9, wherein the identification of the acknowledgement packets according to said certain pattern is based on identifying a certain number of acknowledgement packets within a match window, said match window being a time window of a predefined duration and that starts with each acknowledgement packet received within the sampling window.

11. One or more devices for supporting estimation of latency over a communication path in a communication network between a data flow shaping node and a probe node, which communication path comprises a data flow target node configured to receive a data flow from a data flow source node via the communication path, the data flow shaping node being configured to provide the data flow in bursts towards the data flow target node, wherein said one or more devices are configured to:
   initiate to transmit, by the data flow shaping node, a sample burst being a burst of said bursts that differs in a predefined manner from preceding and subsequent bursts so that the data flow target node in response to the sample burst transmits a certain pattern of acknowledgement packets that differs compared to patterns of acknowledgement packets transmitted by the data flow target node in response to said preceding and subsequent bursts, and
   initiate to identify, by the probe node, receipt of potential acknowledgement packets according to said certain pattern.

12. The one or more devices as claimed in claim 11, wherein said one or more devices are further configured to:
   initiate to determine an estimate of the latency based on timing information regarding transmission of the sample burst and receipt by the probe node of said identified potential acknowledgement packets.

13. The one or more devices as claimed in claim 12, wherein the estimate of the latency is based on when one or more of the identified potential acknowledgement packets were received by the probe node and when one or more packets of the sample burst that caused said one or more identified potential acknowledgement packets were transmitted by the data flow shaping node.

14. The one or more devices as claimed in claim 11, wherein said sample burst differs in that at least two data packets of the sample burst are in an incorrect order.

15. The one or more devices as claimed in claim 14, wherein said incorrect order is accomplished by swapping place of two packets.

16. The one or more devices as claimed in claim 15, wherein the two packets swapping place are consecutively occurring packets.

17. The one or more devices as claimed in claim 14, wherein said at least two packets comprise the first transmitted packet of the sample burst.

18. The one or more devices as claimed in claim 14, wherein said at least two packets comprise the last transmitted packet of the sample burst.

19. The one or more devices as claimed in claim 11, wherein the identification of the potential acknowledgement packets according to said certain pattern is based on that the potential acknowledgement packets are received by the probe node during a sampling window, said sampling window corresponding to a first time interval that is predefined and covers a time period during which potential acknowledgement packets from the sample burst can be expected.

20. The one or more devices as claimed in claim 19, wherein the identification of the acknowledgement packets according to said certain pattern is based on identifying a certain number of acknowledgement packets within a match window, said match window being a time window of a predefined duration and that starts with each acknowledgement packet received within the sampling window.

\* \* \* \* \*